United States Patent
Tenny et al.

(10) Patent No.: US 8,483,732 B2
(45) Date of Patent: Jul. 9, 2013

(54) METHOD AND APPARATUS FOR TIMESTAMPING UPLINK MESSAGES

(75) Inventors: Nathan Edward Tenny, Poway, CA (US); Parag Arun Agashe, San Diego, CA (US); Kirk Allan Burroughs, Alamo, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 12/912,328

(22) Filed: Oct. 26, 2010

(65) Prior Publication Data

US 2011/0269434 A1 Nov. 3, 2011

Related U.S. Application Data

(60) Provisional application No. 61/255,404, filed on Oct. 27, 2009.

(51) Int. Cl.
*H04B 15/00* (2006.01)
*H04B 7/212* (2006.01)
*H04J 3/06* (2006.01)

(52) U.S. Cl.
USPC ........... 455/502; 370/324; 370/328; 370/509; 370/512

(58) Field of Classification Search
None
See application file for complete search history.

(56) References Cited

U.S. PATENT DOCUMENTS

| 7,139,225 B2 * | 11/2006 | Farmer | 368/46 |
| 2002/0006805 A1 * | 1/2002 | New et al. | 455/525 |
| 2004/0190378 A1 | 9/2004 | Farmer | |

FOREIGN PATENT DOCUMENTS

| WO | WO0193460 A1 | 12/2001 |
| WO | WO2009008646 A2 | 1/2009 |
| WO | WO2009120462 | 10/2009 |

OTHER PUBLICATIONS

International Search Report and Written Opinion—PCT/US2010/054348—International Search Authority, European Patent Office,Jan. 28, 2011.
3GPP TS 36.455 V9.3.0 (Sep. 2010), "3rd Generation Partnership Project; Technical Specification Group Radio Access Network; Evolved Universal Terrestrial Radio Access (E-UTRA); LTE Positioning Protocol A (LPPa) (Release 9)" pp. 1-52.

* cited by examiner

*Primary Examiner* — Wesley Kim
(74) *Attorney, Agent, or Firm* — Francois A. Palaez; John J. Ketchum

(57) ABSTRACT

Methods and devices are provided for disambiguating the timing of uplink transmissions. In one embodiment, the method may involve receiving from a wireless network a global time value having a wraparound time longer than that of a system frame number for the network, the global time value being based at least in part on an overhead message conveying at least one parameter of a first radio access technology (RAT) different from a second RAT used by the network. The method may involve determining a current global time based on the received global time value, and sending an uplink message that includes the current global time as a global timestamp.

52 Claims, 13 Drawing Sheets

METHOD AND APPARATUS FOR TIMESTAMPING UPLINK MESSAGES

CLAIM OF PRIORITY UNDER 35 U.S.C. §119

The present Application for Patent claims priority to Provisional Application No. 61/255,404, entitled "METHOD AND APPARATUS TO ENABLE USE OF BROADCAST EXTERNAL TIME REFERENCE FOR TIMESTAMPING UPLINK MESSAGES," filed Oct. 27, 2009, and is assigned to the assignee hereof, and is hereby expressly incorporated in its entirety by reference herein.

BACKGROUND

1. Field

The present application relates generally to wireless communications, and more specifically to systems and methods for disambiguating the timing of uplink transmissions.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an evolved NodeB (eNB) and mobile entities (MEs), such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

In certain systems that lack an external time reference (e.g., 3GPP LTE), the periodicity of the system frame number (SFN), which provides the longest meaningful range of a time reference operable in the system, may be on the order of ten seconds. As a result, for certain purposes, such as, for example, position measurements or events that may be reported by a ME to a wireless network well after being logged by the ME, the wraparound time may be too short to give accurate timing information. Moreover, even with a longer wraparound time, reporting time relative to the transmission of a particular base station could incur other problems if the relationship of base station time to some global (e.g. Universal Time Coordinated (UTC) or Global Positioning System (GPS)) time was not known. Accordingly, it would be desirable to approximate a current global time, and to include the approximated current global time in an uplink message, thereby disambiguating the timing of uplink transmissions. It is noted that the global time may not in fact be a reference to any particular external timeline, as long as it is internally consistent.

SUMMARY

In accordance with one or more embodiments and corresponding disclosure thereof, various aspects are described in connection with a method performed by a mobile entity (ME) in a wireless network. The method may involve receiving from the network a global time value having a wraparound time longer than that of a system frame number for the network. The global time value may be based at least in part on an overhead message that provides information related to a first radio access technology (RAT) different from a second RAT used by the network. The method may involve determining a current global time based on the received global time value. The method may involve sending an uplink message, the message including the current global time as a global timestamp. The information provided in the overhead message may comprise at least one parameter directed to interoperation of the second RAT with the first RAT.

In related aspects, the method may involve calculating an alignment between a global time reference of the received global time value and a local time reference, and using the calculated alignment to determine the current global time. Using the calculated alignment may involve utilizing an evolved NodeB (eNB) timing of the second RAT to extrapolate the current global time over an interval shorter than an eNB wraparound time. In the alternative, or in addition, using the calculated alignment may involve utilizing an internal timing to extrapolate the current global time over an interval longer than an eNB wraparound time.

In further related aspects, determining the current global time may involve synchronizing an internal clock of the ME with the received global time value, and using the synchronized internal clock to determine the current global time. In yet further related aspects, the uplink message may include measurements for position determination, and/or at least one report of an event detected by the ME. In still further related aspects, the uplink message may be delivered to a server in the network. In other related aspects, an electronic device may be configured to execute the above described methodology.

In accordance with one or more embodiments and corresponding disclosure thereof, various aspects are described in connection with a method performed by an infrastructure entity (e.g., an eNB) in a wireless network. The method may involve determining a global time value having a wraparound time longer than that of a system frame number for the network, wherein the global time value is based on at least one parameter (e.g., conveyed in an overhead message) applicable to a first RAT different from a second RAT used by the network. The method may involve broadcasting the global time value. The at least one parameter may be independent of parameters related to interoperation of the second RAT with the first RAT.

In related aspects, the method may involve sending the global time value to a server of the network. The global time value may be sent to the server (a) periodically, (b) in response to a request from the server, and/or (c) in response to an event detected by the infrastructure entity. For example, the server may comprise an Evolved Serving Mobile Location Center (E-SMLC) server or a Secure User Plane (SUPL)

Location Platform (SLP) server. The global time value may be sent to the E-SMLC server using LTE Positioning Protocol A (LPPa) or the like.

In further related aspects, the method may involve receiving an uplink message from at least one ME, the message including a current global time calculated by the at least one ME. In still further related aspects, an electronic device may be configured to execute the above described methodology.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other novel features will become apparent from the following detailed description when considered in conjunction with the drawings and the disclosed aspects are intended to include all such aspects and their equivalents.

DESCRIPTION

Figure 1:
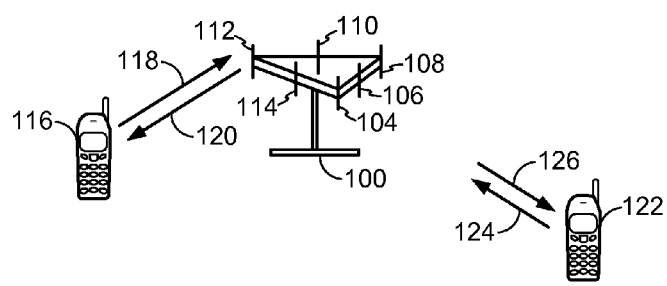
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single-Carrier Frequency Division Multiple Access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional including 112 and 114. In FIG. 1, two antennas are shown for each antenna group, however, more or fewer antennas may be utilized for each antenna group. A mobility entity (ME) 116 is in communication with the antennas 112 and 114, where the antennas 112 and 114 transmit information to the ME 116 over a forward link 120 and receive information from the ME 116 over a reverse link 118. An ME 122 is in communication with the antennas 104 and 106, where the antennas 104 and 106 transmit information to the ME 122 over a forward link 126 and receive information from the ME 122 over a reverse link 124. In a Frequency Division Duplex (FDD) system, the communication links 118, 120, 124 and 126 may use different frequency for communication. For example, the forward link 120 may use a different frequency than that used by the reverse link 118.

Each group of antennas and/or the area in which they are designed to communicate is often referred to as a sector of the access point. In the embodiment, antenna groups each are designed to communicate to MEs in a sector, of the areas covered by the access point 100.

In communication over the forward links 120 and 126, the transmitting antennas of the access point 100 may utilize beamforming in order to improve the signal-to-noise ratio of forward links for the different MEs 116 and 122. Also, an access point using beamforming to transmit to MEs scattered randomly through its coverage causes less interference to MEs in neighboring cells than an access point transmitting through a single antenna to all its MEs.

An access point may be a fixed station used for communicating with the terminals and may also be referred to as an access point, a NodeB, an eNB, or some other terminology. A ME may also be referred to as an access terminal (AT), a user equipment (UE), a mobile station, a wireless communication device, terminal, or the like.

Figure 2:
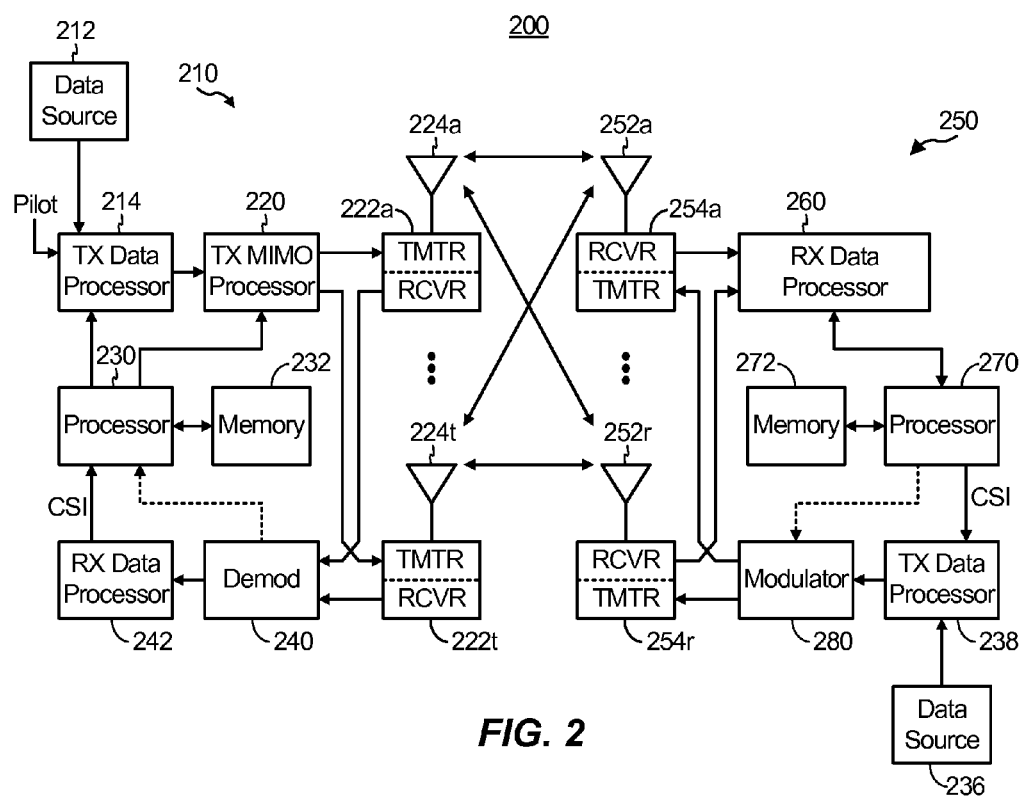
FIG. 2 illustrates a block diagram of a communication system.

FIG. 2 is a block diagram of an embodiment of a transmitter system 210 (also known as an access point) and a receiver system 250 (also known as a ME) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
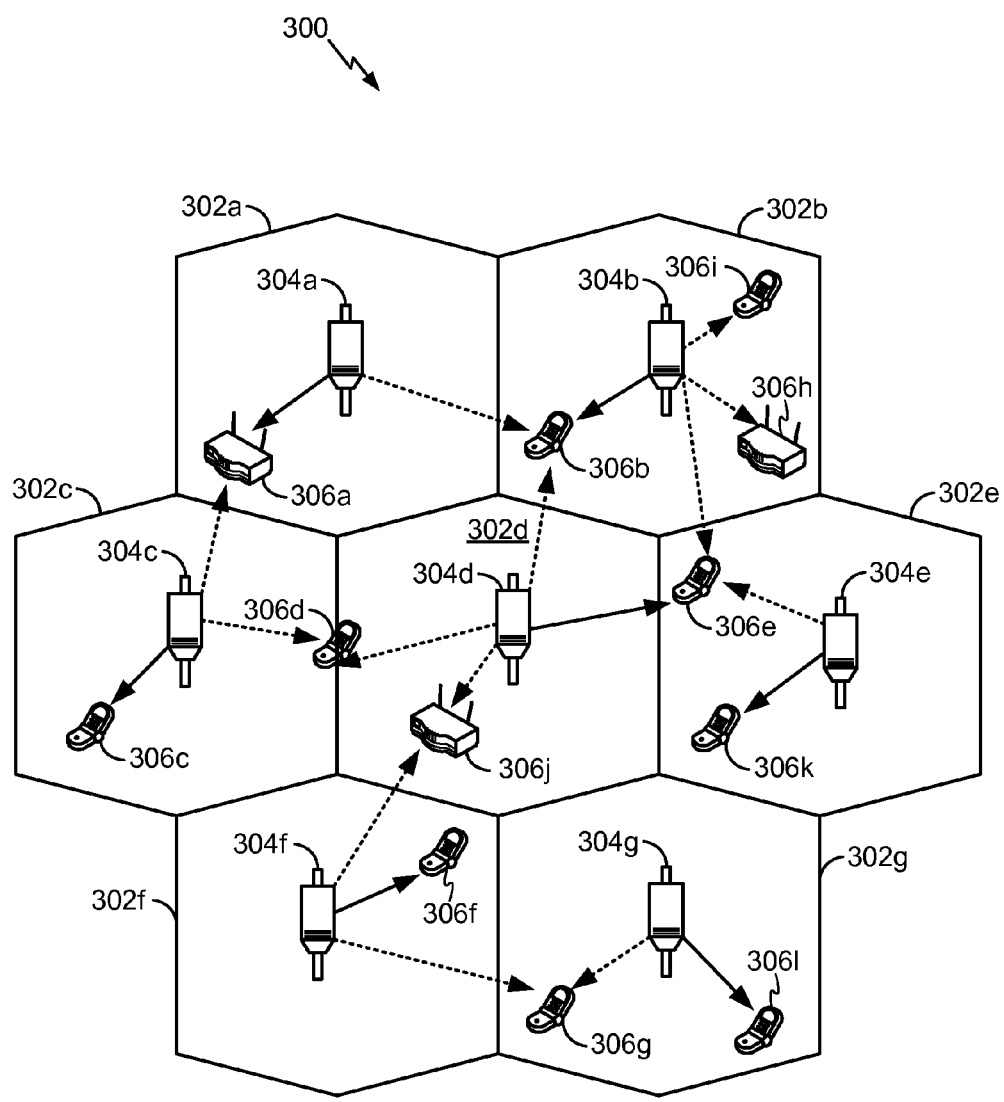
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 3, MEs 306 (e.g., MEs 306a-306l) may be dispersed at various locations throughout the system over time. Each ME 306 may communicate with one or more access nodes 304 on a forward link ("FL") and/or a reverse link ("RL") at a given moment, depending upon whether the ME 306 is active and whether it is in soft handoff (if applicable), for example. The wireless communication system 300 may provide service over a large geographic region. For example, macro cells 302a-302g may cover a few blocks in an urban or suburban neighborhood or a few square miles in a rural environment.

Figure 4:
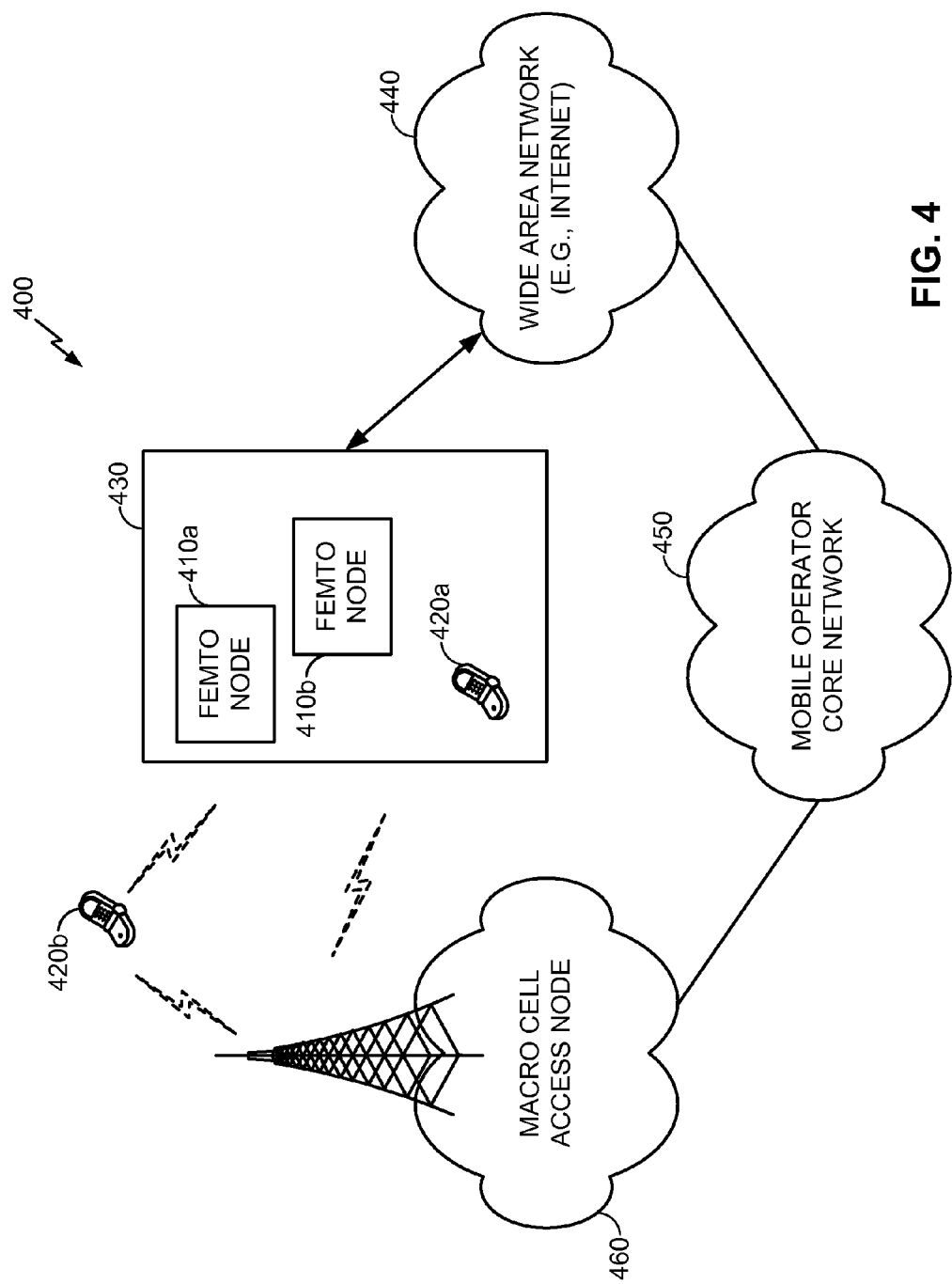
FIG. 4 illustrates an exemplary communication system to enable deployment of femto nodes within a network environment.

FIG. 4 illustrates an exemplary communication system 400 where one or more femto nodes are deployed within a network environment. Specifically, the system 400 includes multiple femto nodes 410 (e.g., femto nodes 410a and 410b) installed in a relatively small scale network environment (e.g., in one or more user residences 430). Each femto node 410 may be coupled to a wide area network 440 (e.g., the Internet) and a mobile operator core network 450 via a DSL router, a cable modem, a wireless link, or other connectivity means (not shown). Each femto node 410 may be configured to serve an associated ME 420a and, optionally, an alien ME 420b. In other words, access to femto node(s) 410 may be restricted whereby a given ME 420 may be served by a set of designated (e.g., home) femto nodes but may not be served by any non-designated femto nodes (e.g., a neighbor's femto node).

Figure 5:
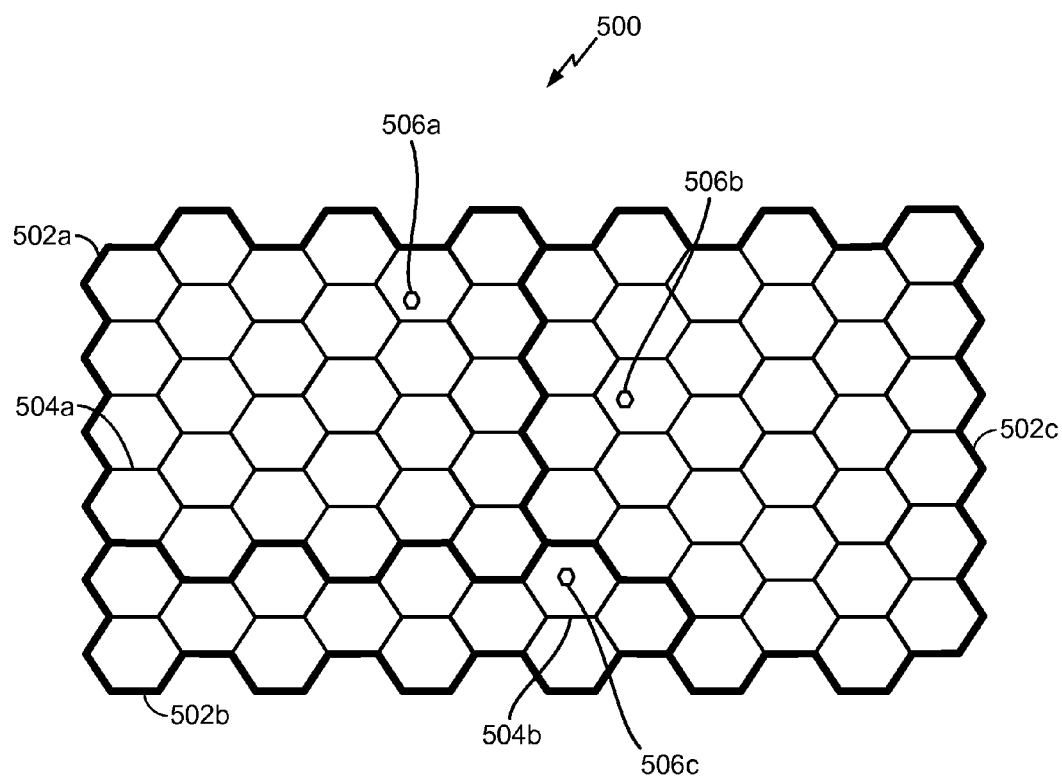
FIG. 5 illustrates an example of a coverage map with several tracking areas defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within the macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Embodiments described herein present techniques for indicating a coarse or a precise global time to disambiguate the timing of uplink transmissions. In LTE, the system frame number (SFN) wraparound time is on the order of approximately ten seconds (1024 frames of 10 ms each). For some purposes, such as reporting of positioning measurements or events that may be reported or evaluated well after being logged by a ME, this wraparound period may be too short to give accurate and unambiguous timing information. In some instances, a report containing only the SFN could be describing an event or measurement that occurred during a previous SFN cycle, which the receiving network may not be able to determine. Alternatively, a report that was sent within the SFN cycle during which the event or measurement had occurred might not be evaluated until long after the SFN cycle had completed or might be evaluated by an entity that had no knowledge of this particular SFN cycle (e.g. a central entity within or outside of the operator's core network). In these cases, inclusion of a valid time within the current SFN cycle would not be useful.

In general, 3GPP systems lack a globally meaningful external time reference because such a time reference is not essential to support 3GPP air interface technologies such as GSM, UMTS, and LTE. However, 3GPP systems that interoperate with CDMA2000 systems generally need a way to indicate the correspondence between the CDMA system time (which is globally defined) and the 3GPP system's timeline. In one embodiment, this information may be provided in system information block (SIB)-8, in the information element (IE) SystemTimeInfo field, which informs the ME about the absolute time according to the CDMA system time of a CDMA2000 system with which the current system interoperates. The CDMA2000 system time is here provided relative to the transmission timing of the eNB that is sending the SIB-8 with a required accuracy of 10 microseconds. Such an accuracy will typically be more than adequate to timestamp uplink event reports, for example. In another embodiment, such absolute time information may be provided in a different overhead message or the like.

Conveniently, the structure of the SIB-8 message in LTE allows the SystemTimeInfo to be sent in isolation, without any additional information included in the SIB-8 message about a particular CDMA2000 system. It follows that in fact an LTE system can use this field to indicate a global reference time even if the LTE system is not in fact interoperating with any CDMA2000 system. Thus, in one embodiment, the SIB-8 time is used as a global timestamp, to be transmitted by the ME along with uplink messages that may require time disambiguation at scales longer than the SFN wraparound period. As CDMA2000 system time is defined to be the same as Global Positioning System (GPS) time, broadcast of the SystemTimeInfo by itself in the SIB-8 message can be equivalent to broadcast of current GPS time. The broadcast is still based on support of CDMA2000 systems since that is what the SIB-8 message is defined for but there is no longer any absolute requirement to support a physically present CDMA2000 system. In contrast, when a CDMA2000 system is present and is supported by the SIB-8 message, the SystemTimeInfo serves to both support interoperability between, for example, an LTE system and the CDMA2000 system and provide global GPS time for uplink reports.

In a system that actually interoperates with CDMA2000, the SIB-8 time would already be provided and correctly synchronized. For systems making use of SIB-8 only to indicate a global timeline, but without any actual CDMA system involved, the meaning of the SIB-8 time can be more arbitrary. For example, the SIB-8 time may refer to a true global reference time (e.g., GPS time, based on GPS receivers at the cell sites, as is typical for CDMA2000) as indicated above. In another example, the SIB-8 time may refer not to any global time like GPS time but to an arbitrary system timeline based on internal synchronization to any preferred degree of accuracy. Such an arbitrary system timeline may or may not be aligned with or related to a particular external reference, although it is aligned internally across different nodes (e.g., eNBs) of the system. It is noted that the preferred degree of accuracy for internal alignment of the system timeline across different nodes could be as coarse as half the SFN wraparound, for example, if the purpose is simply to allow disambiguation of uplink timestamps.

Figure 6:
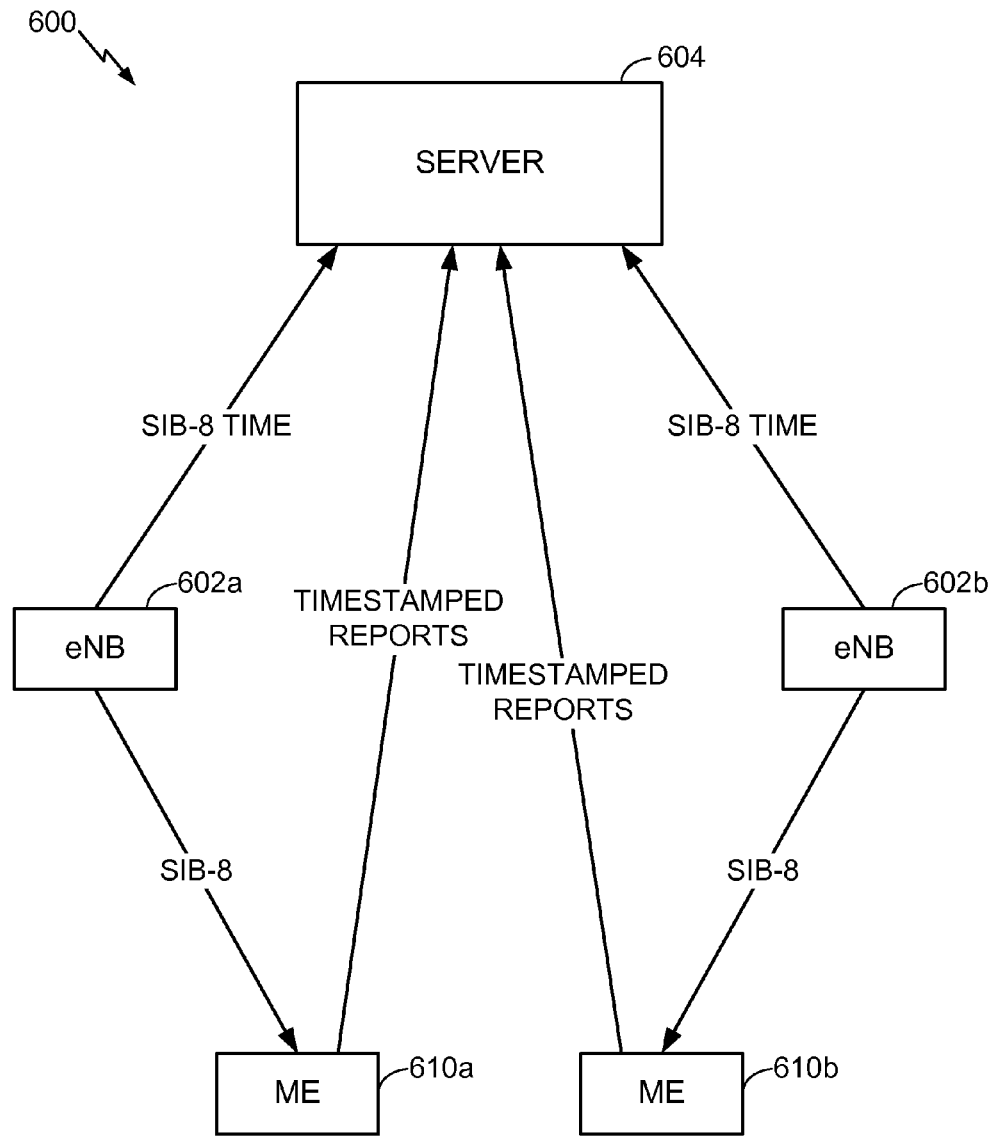
FIG. 6 illustrates one embodiment of a distribution of fictitious system information block time in a network environment.

In case the uplink messaging in question is destined for a server in the upper layers of the network, there may be a need to propagate the SIB-8 timeline to the server as well. This could be achieved through internal synchronization in the network (e.g., via Network Time Protocol (NTP), the IEEE 1588 standard for the synchronization of network devices, or the like), or by explicit indication of the timeline from the eNBs that transmit the global time in the SIB-8 to the server. It may also be achieved by aligning or relating the SIB-8 time to some global time (e.g. Universal Time Coordinated (UTC) or GPS time) and providing the server with both this alignment or relationship (e.g. via configuration) and access to the particular global time thereby enabling the server to relate any received SIB-8 time to the chosen global time. FIG. 6 shows the behavior where eNBs provide their SIB-8 time to the server.

With continued reference to FIG. 6, there is shown a network 600 that includes an eNB 602a and an eNB 602b that are in operative communication (e.g., via a backhaul) with a server 604 in the upper layers of the network 600. For example, the server 604 may comprise an Evolved Serving Mobile Location Center (E-SMLC) in the case of positioning measurements, or a Self Organizing Network (SON) server in the case of certain architectures for so-called "Minimisation of Drive Tests" (MDT) measurements.

An ME 610a may communicate over the air with the eNB 602a, and an ME 610b may similarly communicate with the eNB 602b. The eNB 602a may send the SIB-8 time to the server 604 and/or to the ME 610a. Similarly, the eNB 602b may send the SIB-8 time to the server 604 and/or to the ME 610b. Sending of the SIB-8 time to the server may comprise including the current transmission time and the current SIB-8 time used by the sending eNB 602a or 602b. Such information may not need to be sent very frequently because the server 604 can extrapolate both times into the future to obtain future associations. The ME 610a and the ME 610b may then send timestamped reports to the server 604, via network infrastructure entities (e.g., the eNB 602a, the eNB 602b, etc.). The included timestamps may comprise just SIB-8 time or both SIB-8 time and local eNB time as received by ME 610a and 610b.

In related aspects, the protocol and interface between the eNBs and the server, which are used to indicate the SIB-8 time to the server (e.g., by polling from the server or by periodic updates), depend on the particular application being considered. In the case of positioning, LTE Positioning Protocol A (LPPa) defined in 3GPP TS 36.455 (which is a publicly available document) is already available for this purpose, wherein the SIB-8 time may be added to the messages used to provide eNB configuration information to the E-SMLC.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
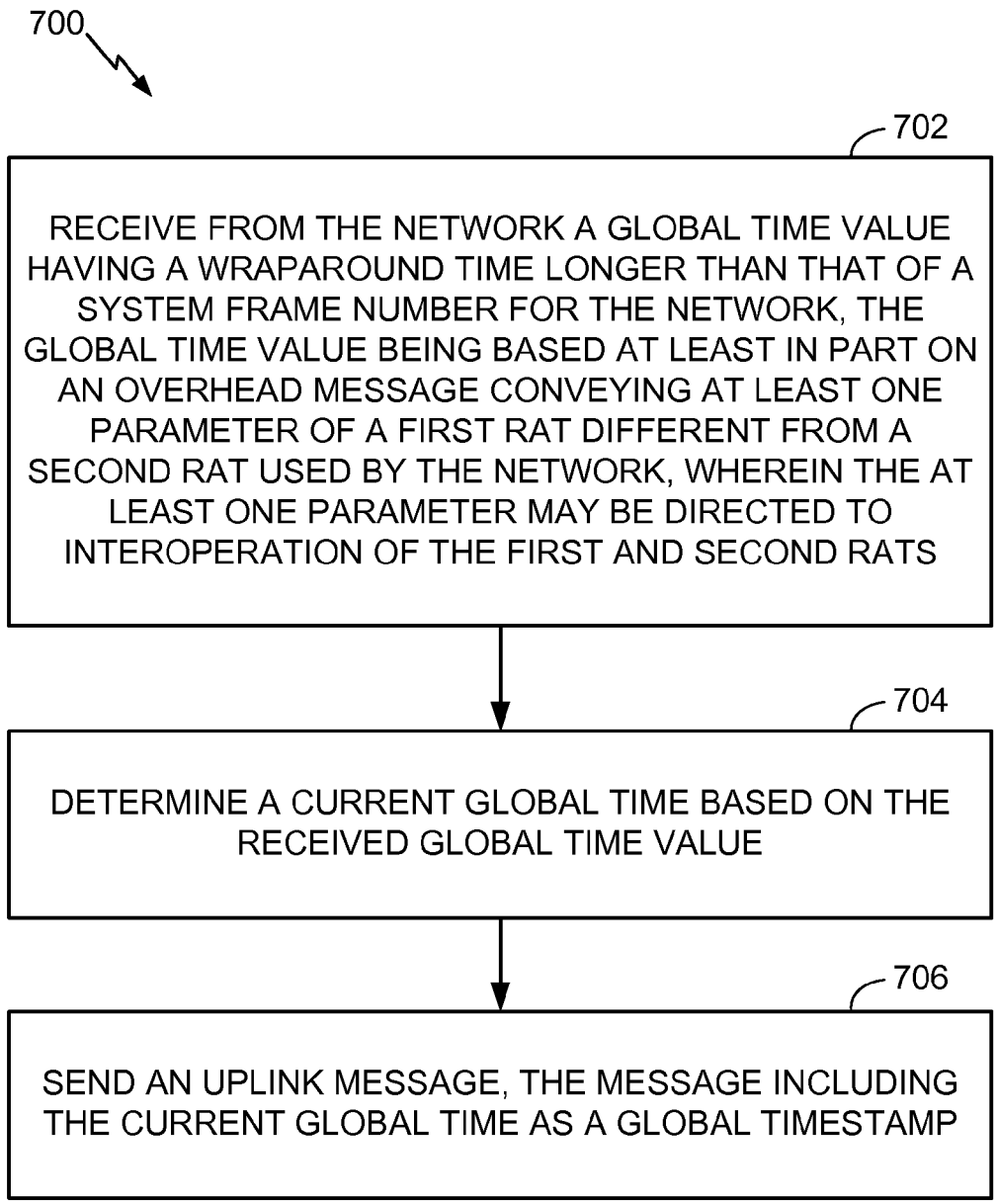
FIG. 7 illustrates an example methodology for timestamping uplink messages.

In accordance with one or more aspects of the subject of this disclosure, there is provided a method for timestamping uplink messages. With reference to FIG. 7, illustrated is a methodology 700 that may be performed at a wireless communication apparatus, such as an ME. At 702, a global time value is received from the network, wherein the global time value has a wraparound time longer than that of a system frame number for the network, and wherein the global time value is based at least in part on an overhead message conveying at least one parameter of a first radio access technology (RAT) different from a second RAT used by the network. At 704, a current global time is determined based on the received global time value. At 706, an uplink message is sent, the message including the current global time as a global timestamp. For example, the at least one parameter may be directed to interoperation of the second RAT with the first RAT.

Figure 8:
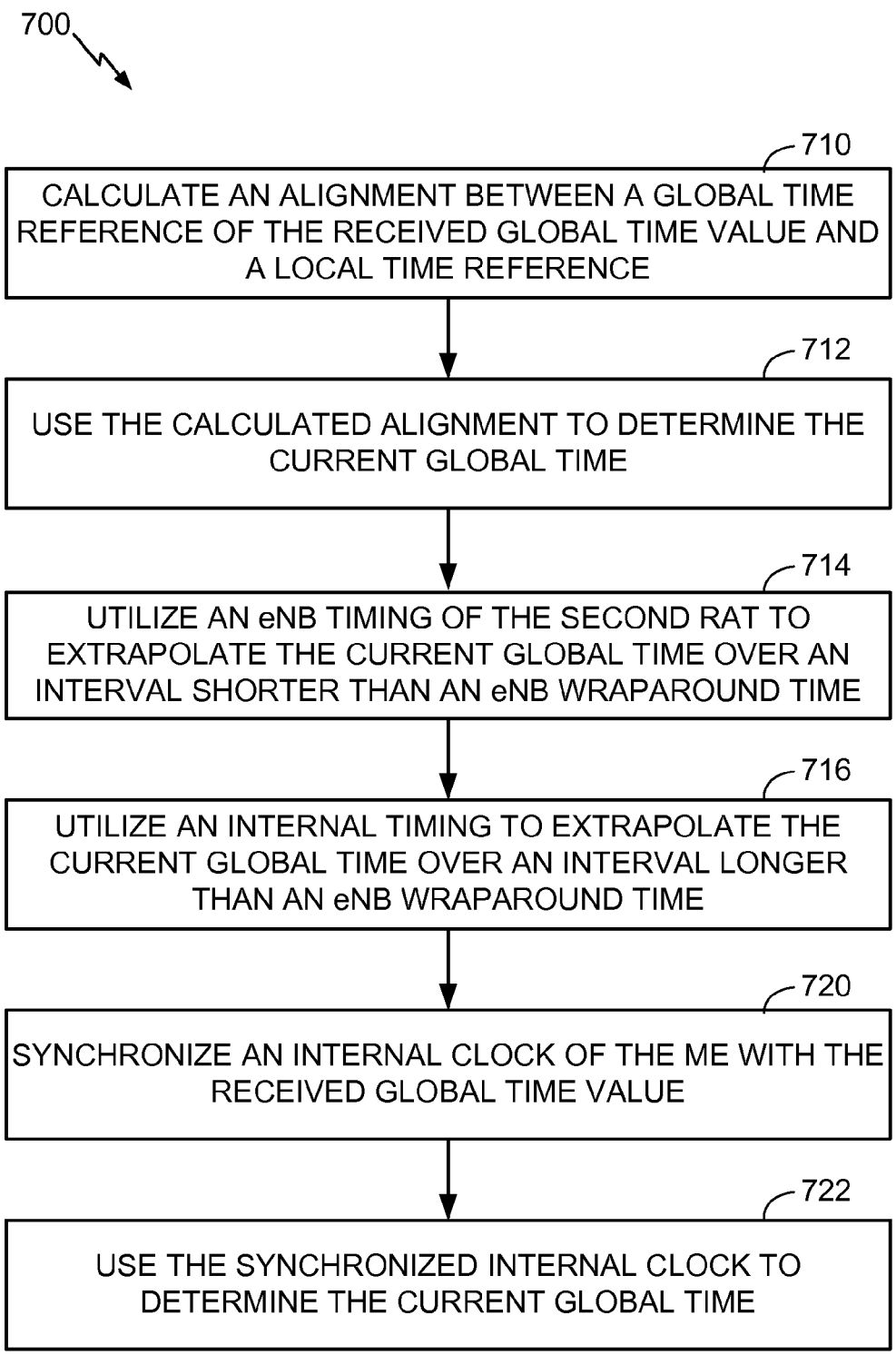
FIG. 8 shows further aspects of the methodology of FIG. 7.

With reference to FIG. 8, determining the current global time may involve, at 710, calculating an alignment between a global time reference of the received global time value and a local time reference and, at 712, using the calculated alignment to determine the current global time. Using the calculated alignment may involve, at 714, utilizing an eNB timing of the second RAT to extrapolate the current global time over an interval shorter than an eNB wraparound time. In the alternative, or in addition, using the calculated alignment may involve, at 716, utilizing an internal timing to extrapolate the current global time over an interval longer than an eNB wraparound time. The method 700 may involve, at 720, synchronizing an internal clock of the UE with the received global time value and, at 722, using the synchronized internal clock to determine the current global time.

In one embodiment, the second RAT may comprise LTE, and the first RAT may comprise CDMA2000. For example, the global time value may be received in SIB-8 and may comprise GPS time or the like. In another example, the global time value may be received in a different downlink message and may comprise GPS time or the like.

In related aspects, the uplink message may include measurement(s) for position determination. The uplink message may contain at least one report of an event detected by the ME. The uplink message may be delivered to a server in the network. The server may comprise an E-SMLC server, a Secure User Plane (SUPL) Location Platform (SLP) server, a SON server, etc.

Figure 9:
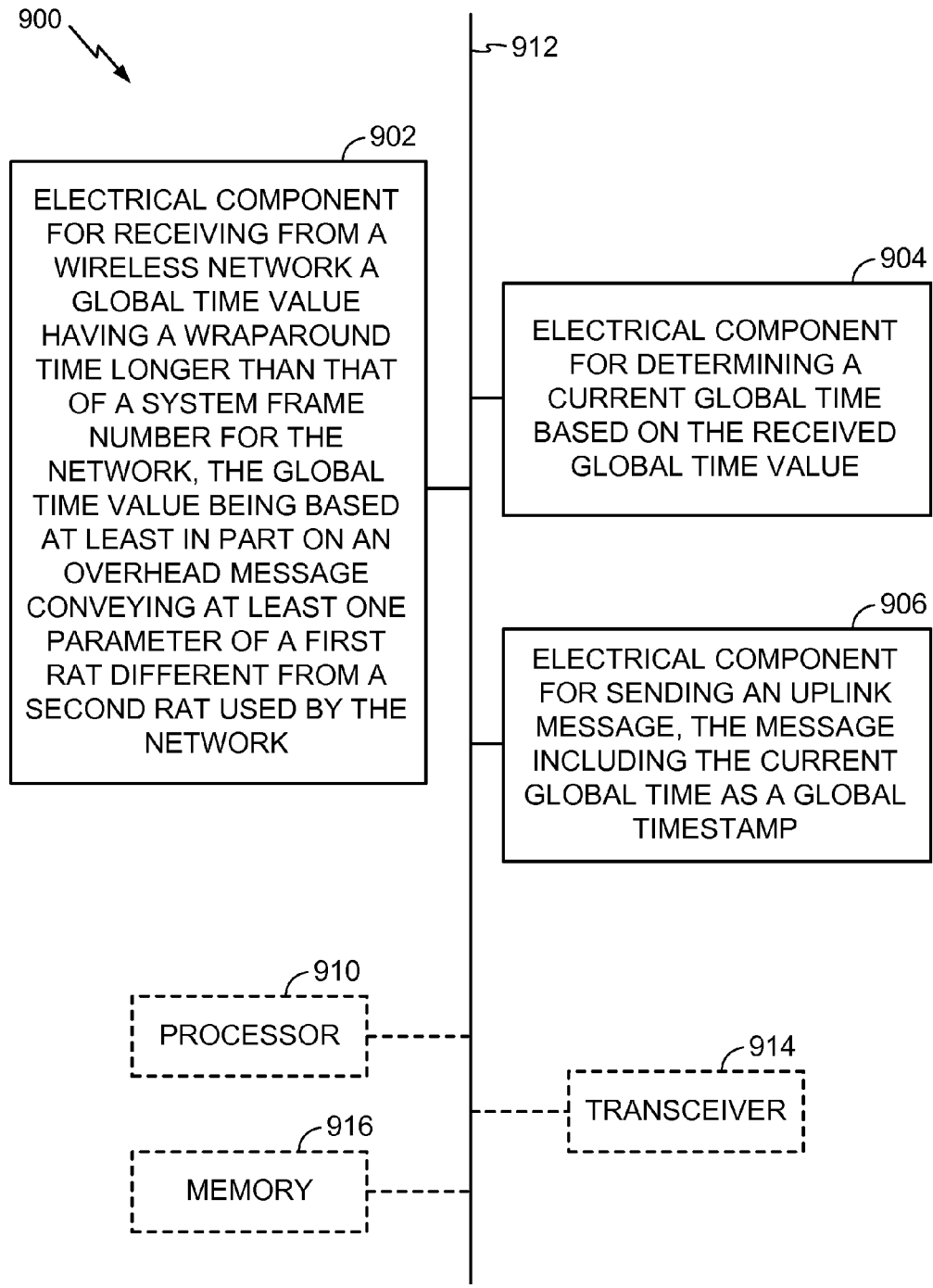
FIG. 9 illustrates an exemplary apparatus for timestamping uplink messages.

In accordance with one or more aspects of the embodiments described herein, there are provided devices and apparatuses for executing the timestamping of uplink messages, as described above with reference to FIGS. 7-8. With reference to FIG. 9, there is provided an exemplary apparatus 900 that may be configured as a ME in a wireless network, or as a processor or similar device for use within the ME. The apparatus 900 may include functional blocks that can represent functions implemented by a processor, software, or combination thereof (e.g., firmware). As illustrated, in one embodiment, the apparatus 900 may comprise an electrical component or module 902 for receiving from the network a global time value having a wraparound time longer than that of a system frame number for the network, the global time value being based at least in part on an overhead message conveying at least one parameter of a first RAT different from a second RAT used by the network. The apparatus 900 may comprise an electrical component 904 for determining a current global time based on the received global time value. The apparatus 900 may comprise an electrical component 906 for sending an uplink message, the message including the current global time as a global timestamp.

Figure 10:
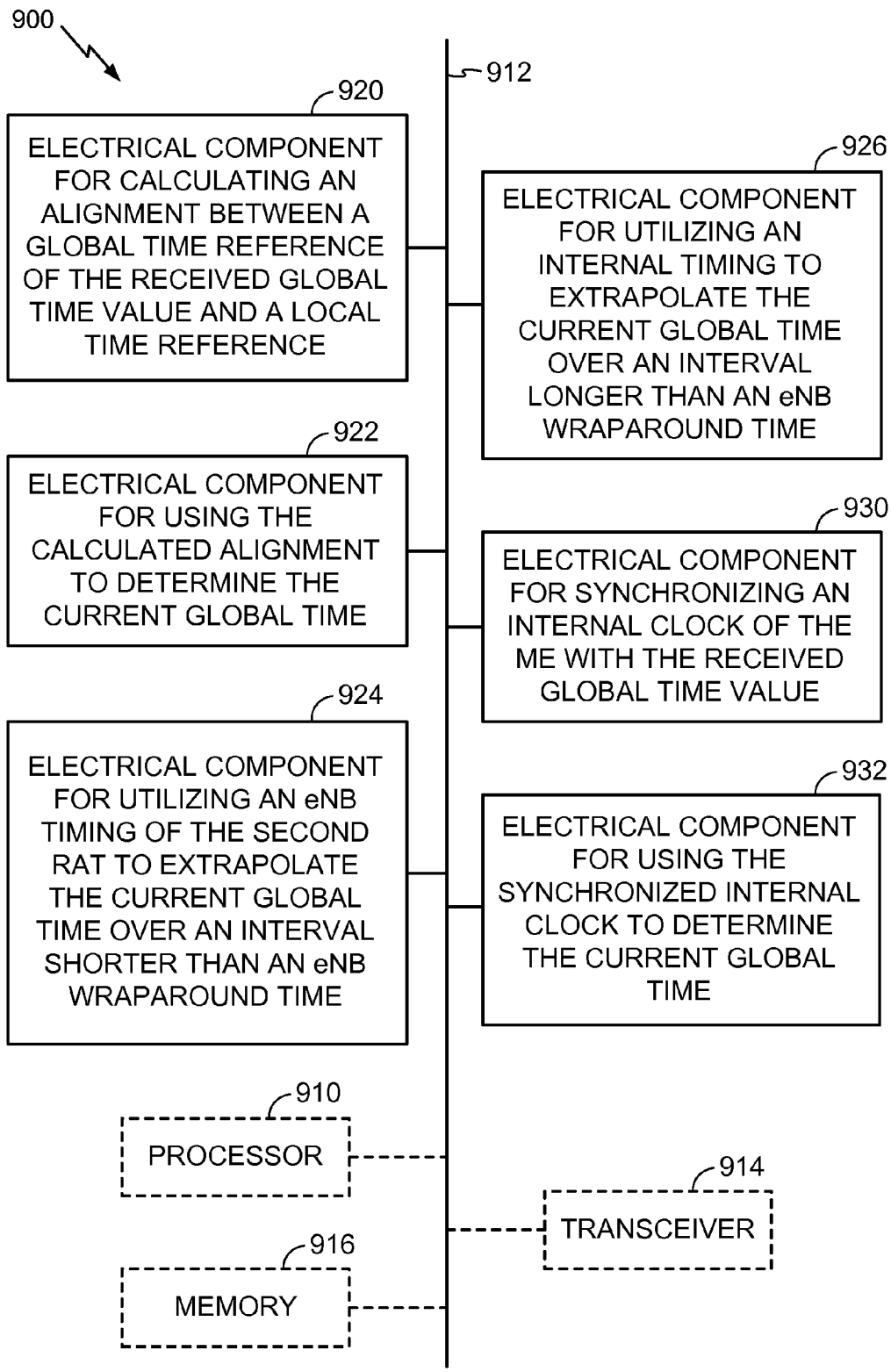
FIG. 10 shows further aspects of the apparatus of FIG. 9.

With reference to FIG. 10, the apparatus 900 may comprise an electrical component 920 for calculating an alignment between a global time reference of the received global time value and a local time reference, and an electrical component 922 for using the calculated alignment to determine the current global time. The apparatus 900 may comprise an electrical component 924 for utilizing an eNB timing of the second RAT to extrapolate the current global time over an interval shorter than an eNB wraparound time. The apparatus 900 may comprise an electrical component 926 for utilizing an internal timing to extrapolate the current global time over an interval longer than an eNB wraparound time. The apparatus 900 may comprises an electrical component 930 for synchronizing an internal clock of the ME with the received global time value, and an electrical component 932 for using the synchronized internal clock to determine the current global time.

In related aspects, the apparatus 900 may optionally include a processor component 910 having at least one processor, in the case of the apparatus 900 configured as a communication network entity, rather than as a processor. The processor 910, in such case, may be in operative communication with the components 902-932 via a bus 912 or similar communication coupling. The processor 910 may effect initiation and scheduling of the processes or functions performed by electrical components 902-932.

In further related aspects, the apparatus 900 may include a radio transceiver component 914. A stand alone receiver and/or stand alone transmitter may be used in lieu of or in conjunction with the transceiver 914. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for effecting the processes and behavior of the components 902-932, and subcomponents thereof, or the processor 910, or the methods disclosed herein. The memory component 916 may retain instructions for executing functions associated with the components 902-932. While shown as being external to the memory 916, it is to be understood that the components 902-932 can exist within the memory 916.

Figure 11:
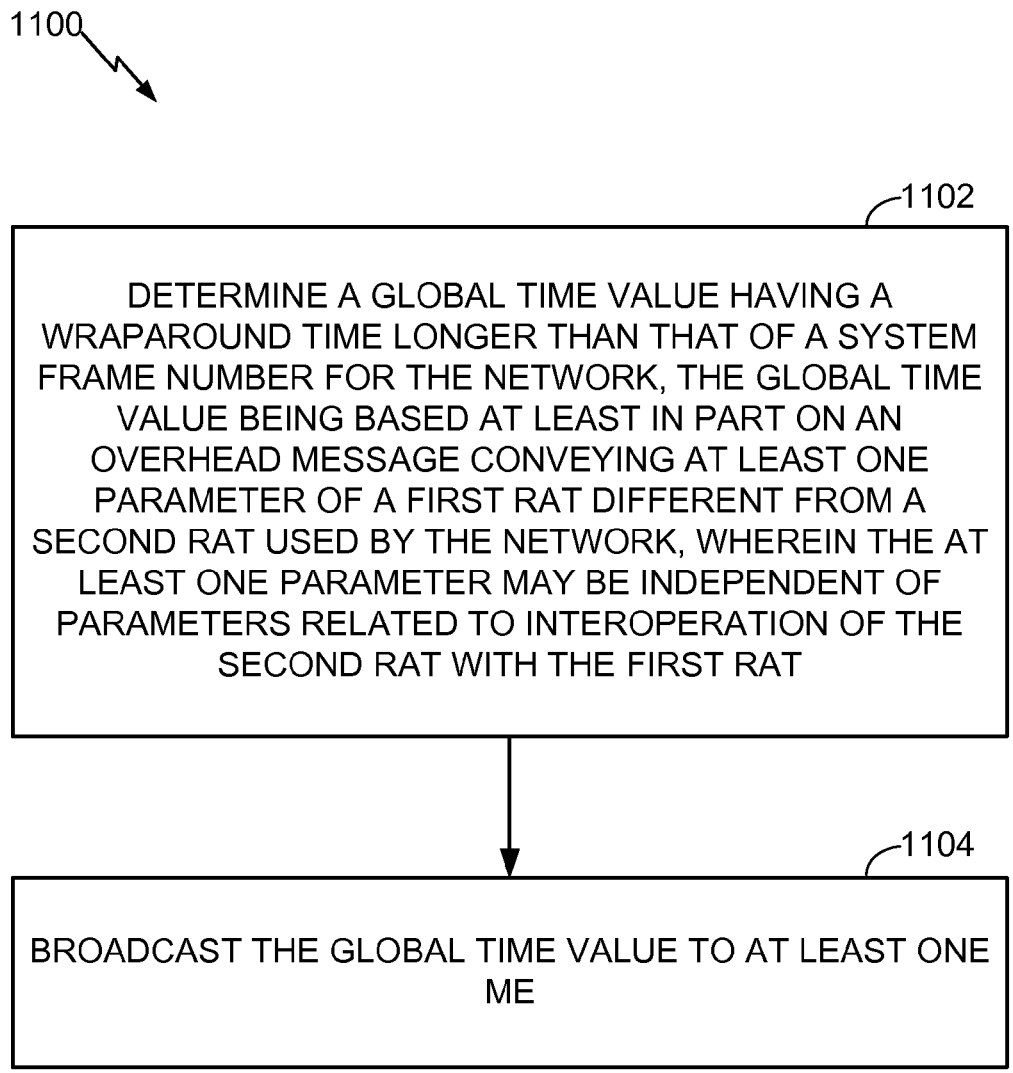
FIG. 11 illustrates an example methodology for broadcasting global time values.

In accordance with one or more aspects of the embodiments described herein, there is provided a methodology operable by an infrastructure entity (e.g., an eNB or the like) in a wireless network. With reference to FIG. 11, there is shown a method 1100 that may involve, at 1102, determining a global time value having a wraparound time longer than that of a system frame number for the network, the global time value being based at least in part on an overhead message conveying at least one parameter of a first RAT different from a second RAT used by the network. The method 1100 may involve, at 1104, broadcasting the global time value to at least one ME. For example, the at least one parameter may be independent of parameters related to interoperation of the second RAT with the first RAT.

Figure 12:
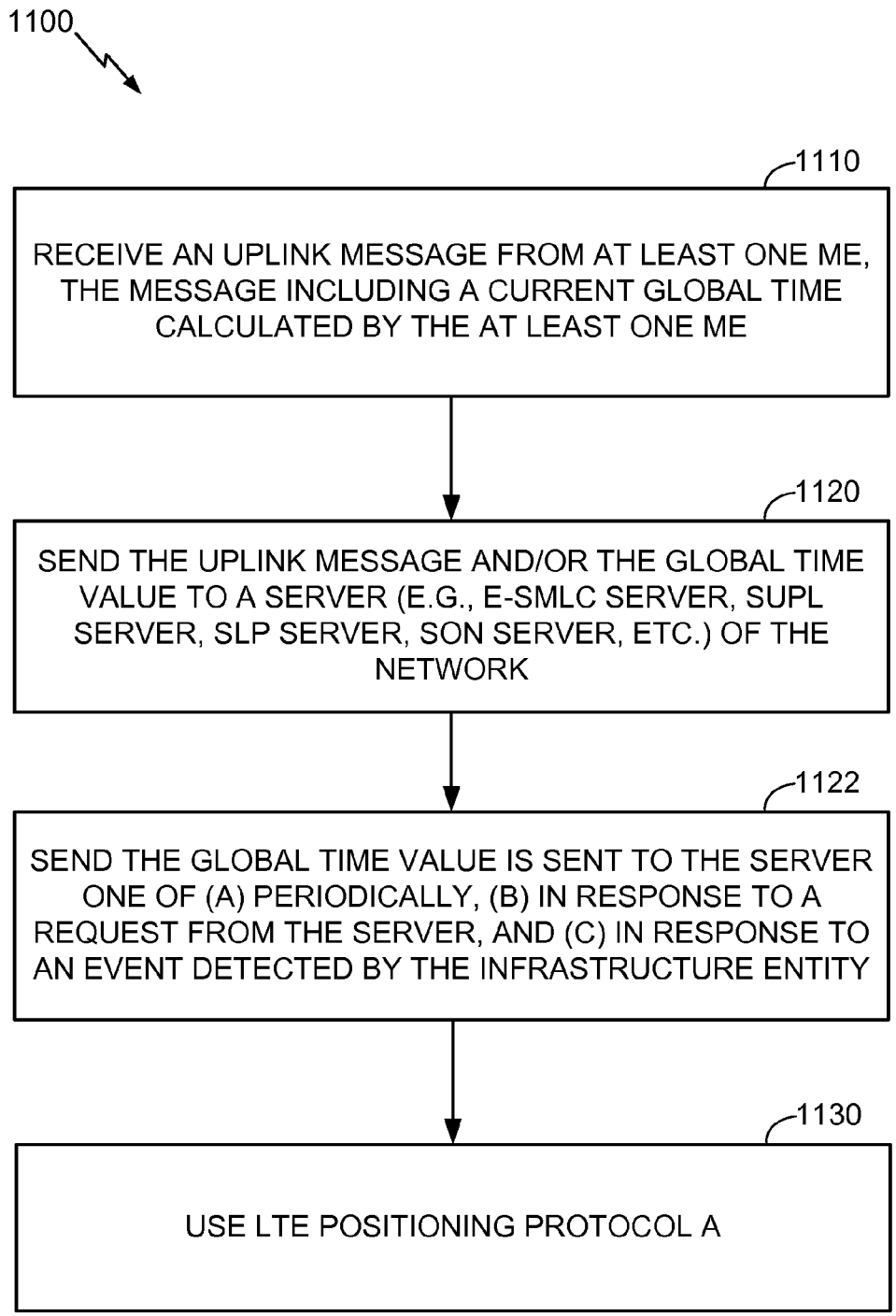
FIG. 12 illustrates further aspects of the methodology of FIG. 11.

With reference to FIG. 12, in related aspects, the method 1100 may involve, at 1110, receiving an uplink message from at least one ME, the message including a current global time calculated by the at least one ME.

In further related aspects, the method 1100 may involve, at 1120, sending the global time value to a server (e.g., an E-SMLC server, an SLP server, etc.) of the network. The method 1100 may involve, at 1122, sending the global time value to the server one of (a) periodically, (b) in response to a request from the server, and (c) in response to an event detected by the infrastructure entity. The method 1100 may involve, at 1130, using LPPa or similar protocol to send the global time value to an E-SMLC server or the like.

Figure 13:
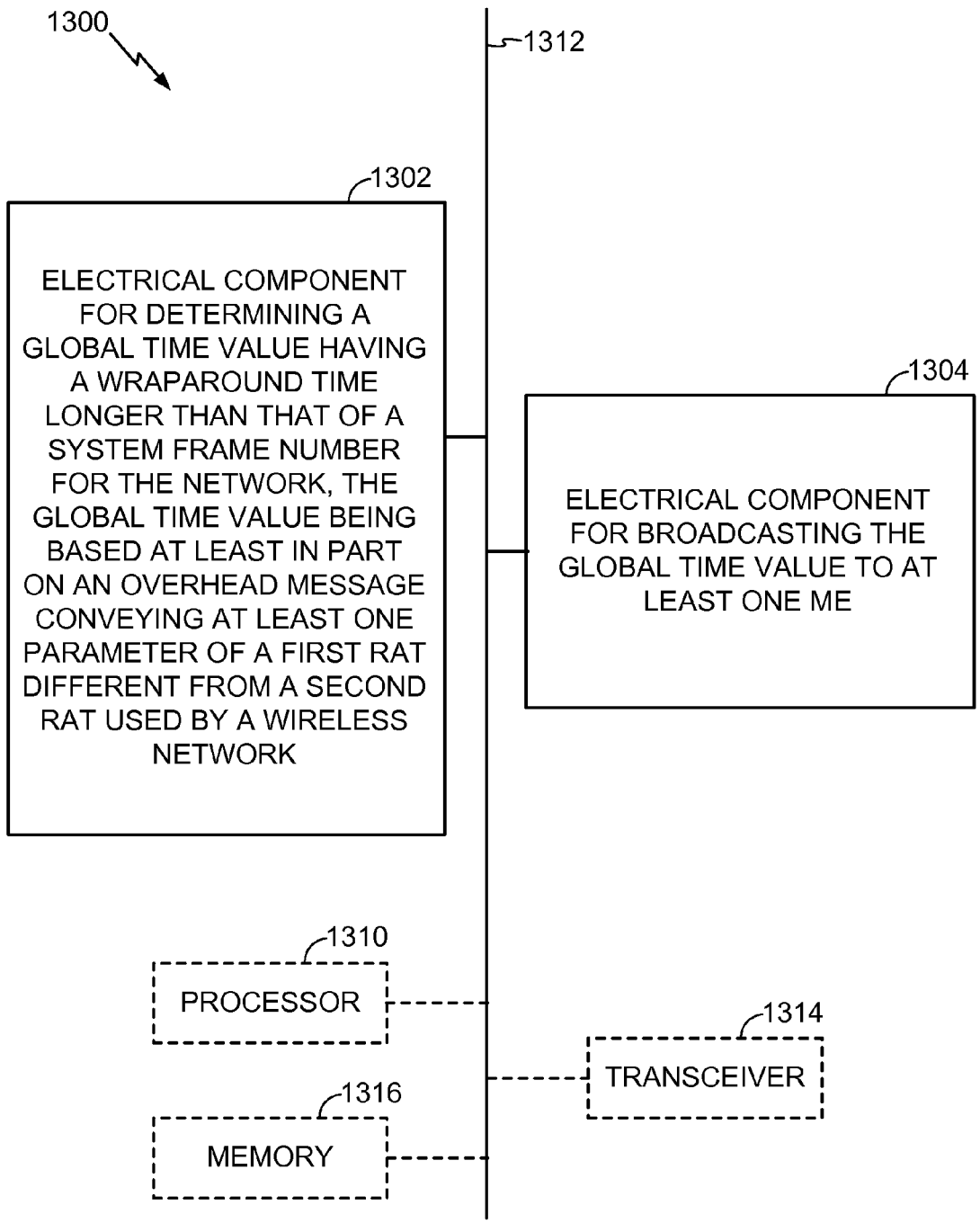
FIG. 13 illustrates an exemplary apparatus for broadcasting global time values.

In accordance with one or more aspects of the embodiments described herein, there are provided devices and apparatuses for executing the broadcasting of a global time value, as described above with reference to FIGS. 11-12. With reference to FIG. 13, there is provided an exemplary apparatus 1300 that may be configured as wireless network infrastructure entity (e.g., eNB), or as a processor or similar device for use within the infrastructure entity. The apparatus 1300 may include functional blocks that can represent functions implemented by a processor, software, or combination thereof. As depicted, in one embodiment, the apparatus 1300 may comprise an electrical component or module 1302 for determining a global time value having a wraparound time longer than that of a system frame number for the network, the global time value being based at least in part on an overhead message conveying at least one parameter of a first RAT different from a second RAT used by the network. The apparatus 1300 may comprise an electrical component 1304 for broadcasting the global time value to at least one ME.

Figure 14:
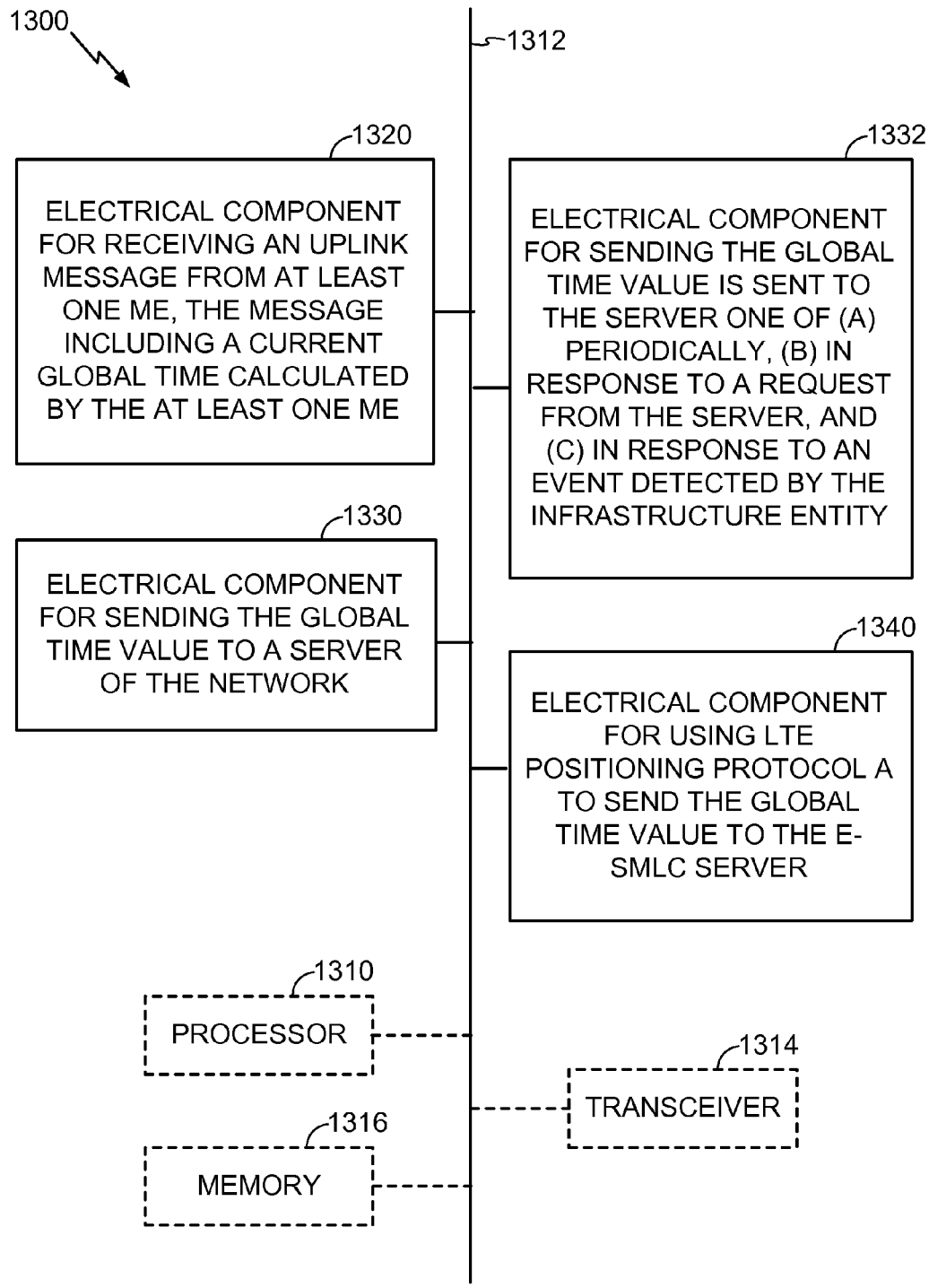
FIG. 14 shows further aspects of the apparatus of FIG. 13.

With reference to FIG. 14, in related aspects, the apparatus 1300 may comprise an electrical component 1320 for receiving an uplink message from at least one mobile entity (ME), the message including a current global time calculated by the at least one ME.

In further related aspects, the apparatus 1300 may comprise an electrical component 1330 for sending the global time value to a server (e.g., an E-SMLC server, an SLP server, etc.) of the network. The apparatus 1300 may comprise an electrical component 1332 for sending the global time value to the server one of (a) periodically, (b) in response to a request from the server, and (c) in response to an event detected by the infrastructure entity. The apparatus 1300 may comprise an electrical component 1340 for using LPPa or other appropriate protocol to send the global time value to an E-SMLC server or the like.

For the sake of conciseness, the rest of the details regarding apparatus 1300 are not further elaborated on; however, it is to be understood that the remaining features and aspects of the apparatus 1300 are substantially similar to those described above with respect to apparatus 900 of FIGS. 9-10.

In accordance with one or more aspects of the embodiments described herein, there is provided a technique for associating a global timestamp with messages sent from a ME to a receiving entity in a wireless network. At an infrastructure entity (e.g., an eNB), the technique may involve indicating a global time value (e.g., a value of CDMA system time provided without additional parameters related to interoperation with a CDMA system) in signaling from the network to the ME, wherein the global time value has a wraparound time longer than that of a system frame number for the network. At the ME, the technique may involve indicating in an uplink message from the ME to the receiving entity (e.g., an eNB) the global time value at which the contents of the message are valid. The signaling used to indicate the global time value may pertain to interoperation with a given RAT different from a RAT used by the network. In related aspects, the uplink message may contain measurements for ME position determination. In the alternative, or in addition, the uplink message may contain at least one report of an event detected by the ME.

In further related aspects, the uplink message may be delivered to a server in the network, wherein the global time value is indicated by at least one infrastructure entity to the server. The indication may occur (a) periodically, (b) in response to a request from the server, and/or (c) in response to an event detected by the at least one infrastructure entity. For example, the global time value may be indicated to an E-SMLC and the interpretation of the timestamp in the uplink message may be carried out between a SLP and the E-SMLC. The indication of the global time value from the at least one infrastructure entity to the E-SMLC may occur using a LPPa or other known protocol.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method operable by a mobile entity (ME) in a wireless network, comprising:
   receiving from the network a global time value having a wraparound time longer than that of a system frame number for the network, the global time value being based at least in part on an overhead message conveying at least one parameter of a first radio access technology (RAT) different from a second RAT used by the network;
   determining a current global time based on the received global time value; and
   sending an uplink message, the message including the current global time as a global timestamp.

2. The method of claim 1, wherein the at least one parameter is directed to interoperation of the second RAT with the first RAT.

3. The method of claim 1, wherein determining comprises:
   calculating an alignment between a global time reference of the received global time value and a local time reference; and
   using the calculated alignment to determine the current global time.

4. The method of claim 3, wherein using comprises utilizing an evolved NodeB (eNB) timing of the second RAT to extrapolate the current global time over an interval shorter than an eNB wraparound time.

5. The method of claim 3, wherein using comprises utilizing an internal timing to extrapolate the current global time over an interval longer than an eNB wraparound time.

6. The method of claim 1, wherein determining comprises:
   synchronizing an internal clock of the ME with the received global time value; and
   using the synchronized internal clock to determine the current global time.

7. The method of claim 1, wherein the second RAT comprises 3rd Generation Partnership Project (3GPP) Long Term Evolution (LTE).

8. The method of claim 7, wherein the first RAT comprises Code Division Multiple Access (CDMA).

9. The method of claim 8, wherein the global time value is received in system information block (SIB)-8.

10. The method of claim 9, wherein the global time value comprises Global Positioning System (GPS) time.

11. The method of claim 1, wherein the uplink message includes measurements for position determination.

12. The method of claim 1, wherein the uplink message contains at least one report of an event detected by the ME.

13. The method of claim 1, wherein the uplink message is delivered to a server in the network, the server comprising one of an Evolved Serving Mobile Location Center (E-SMLC) server, a Secure User Plane (SUPL) Location Platform (SLP) server, and a Self Organising Network (SON) server.

14. The method of claim 1, wherein the at least one parameter is independent of parameters related to interoperation between of the second RAT with the first RAT.

15. An apparatus, comprising:
   at least one processor configured to: receive from a wireless network a global time value having a wraparound time longer than that of a system frame number for the network, the global time value being based at least in part on an overhead message conveying at least one parameter of a first radio access technology (RAT) different from a second RAT used by the network; determine a current global time based on the received global time value; and send an uplink message, the message including the current global time as a global timestamp; and
   a memory coupled to the at least one processor for storing data.

16. The apparatus of claim 15, wherein the at least one processor determines the current global time by:
   calculating an alignment between a global time reference of the received global time value and a local time reference; and
   using the calculated alignment to determine the current global time.

17. The apparatus of claim 16, wherein the at least one processor utilizes an evolved NodeB (eNB) timing of the second RAT to extrapolate the current global time over an interval shorter than an eNB wraparound time.

18. The apparatus of claim 16, wherein the at least one processor utilizes an internal timing to extrapolate the current global time over an interval longer than an eNB wraparound time.

19. The apparatus of claim 15, wherein the at least one processor determines the current global time by:
  synchronizing an internal clock of the ME with the received global time value; and
  using the synchronized internal clock to determine the current global time.

20. An apparatus, comprising:
  means for receiving from a wireless network a global time value having a wraparound time longer than that of a system frame number for the network, the global time value being based at least in part on an overhead message conveying at least one parameter of a first radio access technology (RAT) different from a second RAT used by the network;
  means for determining a current global time based on the received global time value; and
  means for sending an uplink message, the message including the current global time as a global timestamp.

21. The apparatus of claim 20, further comprising:
  means for calculating an alignment between a global time reference of the received global time value and a local time reference; and
  means for using the calculated alignment to determine the current global time.

22. The apparatus of claim 21, further comprising means for utilizing an evolved NodeB (eNB) timing of the second RAT to extrapolate the current global time over an interval shorter than an eNB wraparound time.

23. The apparatus of claim 21, further comprising means for utilizing an internal timing to extrapolate the current global time over an interval longer than an eNB wraparound time.

24. The apparatus of claim 20, further comprising:
  means for synchronizing an internal clock of a mobile entity (ME) with the received global time value; and
  means for using the synchronized internal clock to determine the current global time.

25. A non-transitory computer-readable medium comprising code for causing a computer to:
  receive from a wireless network a global time value having a wraparound time longer than that of a system frame number for the network, the global time value being based at least in part on an overhead message conveying at least one parameter of a first radio access technology (RAT) different from a second RAT used by the network;
  determine a current global time based on the received global time value; and
  send an uplink message, the message including the current global time as a global timestamp.

26. The non-transitory computer-readable medium of claim 25, further comprising code for causing the computer to:
  calculate an alignment between a global time reference of the received global time value and a local time reference; and
  use the calculated alignment to determine the current global time.

27. The non-transitory computer-readable medium of claim 26, further comprising code for causing the computer to utilize an evolved NodeB (eNB) timing of the second RAT to extrapolate the current global time over an interval shorter than an eNB wraparound time.

28. The non-transitory computer-readable medium of claim 26, further comprising code for causing the computer to utilize an internal timing to extrapolate the current global time over an interval longer than an eNB wraparound time.

29. The non-transitory computer-readable medium of claim 25, further comprising for causing the computer to:
  synchronize an internal clock of a mobile entity (ME) with the received global time value; and
  use the synchronized internal clock to determine the current global time.

30. A method operable by an infrastructure entity in a wireless network, comprising:
  determining a global time value having a wraparound time longer than that of a system frame number for the network, the global time value being based at least in part on an overhead message conveying at least one parameter of a first radio access technology (RAT) different from a second RAT used by the network; and
  broadcasting the global time value to at least one mobile entity (ME).

31. The method of claim 30, wherein the at least one parameter is independent of parameters related to interoperation of the second RAT with the first RAT.

32. The method of claim 30, wherein the infrastructure entity comprises an evolved NodeB (eNB).

33. The method of claim 30, further comprising receiving an uplink message from at least one ME, the message including a current global time calculated by the at least one ME.

34. The method of claim 30, further comprising sending the global time value to a server of the network.

35. The method of claim 34, wherein the global time value is sent to the server one of (a) periodically, (b) in response to a request from the server, and (c) in response to an event detected by the infrastructure entity.

36. The method of claim 34, wherein the server comprises one of an Evolved Serving Mobile Location Center (E-SMLC) server and a Secure User Plane (SUPL) Location Platform (SLP) server.

37. The method of claim 36, wherein sending the global time value to the E-SMLC server comprises using LTE Positioning Protocol A (LPPa).

38. An apparatus, comprising:
  at least one processor configured to: determine a global time value having a wraparound time longer than that of a system frame number for the network, the global time value being based at least in part on an overhead message conveying at least one parameter of a first radio access technology (RAT) different from a second RAT used by a wireless network; and broadcast the global time value to at least one mobile entity (ME); and
  a memory coupled to the at least one processor for storing data.

39. The apparatus of claim 38, wherein the infrastructure entity comprises an evolved NodeB (eNB).

40. The apparatus of claim 38, wherein the at least one processor receives an uplink message from at least one ME, the message including a current global time calculated by the at least one ME.

41. The apparatus of claim 38, wherein the at least one processor sends the global time value to a server of the network.

42. The apparatus of claim 41, wherein the global time value is sent to the server one of (a) periodically, (b) in response to a request from the server, and (c) in response to an event detected by the infrastructure entity.

43. The apparatus of claim 41, wherein the server comprises one of an Evolved Serving Mobile Location Center (E-SMLC) server and a Secure User Plane (SUPL) Location Platform (SLP) server.

44. The apparatus of claim 43, wherein the at least one processor uses LTE Positioning Protocol A (LPPa) to send the global time value to the E-SMLC server.

45. An apparatus, comprising:
- means for determining a global time value having a wraparound time longer than that of a system frame number for the network, the global time value being based at least in part on an overhead message conveying at least one parameter of a first radio access technology (RAT) different from a second RAT used by a wireless network; and
- means for broadcasting the global time value to at least one mobile entity (ME).

46. The apparatus of claim 45, wherein the infrastructure entity comprises an evolved NodeB (eNB).

47. The apparatus of claim 45, further comprising means for receiving an uplink message from at least one ME, the message including a current global time calculated by the at least one ME.

48. The apparatus of claim 45, further comprising means for sending the global time value to a server of the network.

49. A non-transitory computer-readable medium comprising code for causing a computer to:
- determine a global time value having a wraparound time longer than that of a system frame number for the network, the global time value being based at least in part on an overhead message conveying at least one parameter of a first radio access technology (RAT) different from a second RAT used by a wireless network; and
- broadcast the global time value to at least one mobile entity (ME).

50. The non-transitory computer-readable medium of claim 49, wherein the infrastructure entity comprises an evolved NodeB (eNB).

51. The non-transitory computer-readable medium of claim 49, further comprising code for causing the computer to receive an uplink message from at least one ME, the message including a current global time calculated by the at least one ME.

52. The non-transitory computer-readable medium of claim 49, further comprising code for causing the computer to send the global time value to a server of the network.

* * * * *